United States Patent
Koide et al.

[11] Patent Number: 6,053,841
[45] Date of Patent: Apr. 25, 2000

[54] TOROIDAL DRIVE SYSTEM FOR ELECTRIC VEHICLES

[75] Inventors: Takeharu Koide, Toyota; Eiji Orisaka, Nisshin; Kinya Yoshii; Kenji Odaka, both of Toyota, all of Japan

[73] Assignee: Toyota Jidosha Kabushiki Kaisha, Toyota, Japan

[21] Appl. No.: 08/934,343

[22] Filed: Sep. 19, 1997

[30] Foreign Application Priority Data

Sep. 19, 1996 [JP] Japan .................................. 8-269193
Aug. 22, 1997 [JP] Japan .................................. 9-242091

[51] Int. Cl.[7] .................................................. B60K 1/00
[52] U.S. Cl. ................................... 476/40; 475/3; 477/3
[58] Field of Search ........................ 476/40, 41; 74/650; 475/214, 215, 216; 477/2, 3

[56] References Cited

U.S. PATENT DOCUMENTS

| | | |
|---|---|---|
| 4,339,966 | 7/1982 | Kraus . |
| 5,372,213 | 12/1994 | Hasebe et al. . |
| 5,683,324 | 11/1997 | Inoue et al. .............................. 475/216 |
| 5,842,945 | 12/1998 | Inoue .................................. 475/216 X |

FOREIGN PATENT DOCUMENTS

| | | |
|---|---|---|
| 0 472 951 | 3/1992 | European Pat. Off. . |
| 325 095 | 7/1902 | France . |
| 1 571 737 | 6/1969 | France . |
| 260 037 | 5/1913 | Germany . |
| 1 208 142 | 12/1965 | Germany . |
| 6-257654 | 9/1994 | Japan . |
| 8-42656 | 2/1996 | Japan . |
| 2 119 328 | 11/1983 | United Kingdom . |
| 2 263 321 | 7/1993 | United Kingdom . |

*Primary Examiner*—Khoi Q. Ta
*Attorney, Agent, or Firm*—Oblon, Spivak, McClelland, Maier & Neustadt, P.C.

[57] ABSTRACT

A drive system for an electric vehicle, which can make the number of parts as small as possible and minimize the space for arranging the parts in a direction perpendicular to the axis. Between a motor acting as a prime mover and left and right output shafts, there are interposed toroidal type continuously variable transmissions which can individually control their gear ratios and their forces for thrusting power rollers. The RPMs and torques of left and right wheels can be individually controlled, and the differential rotation between the left and right wheels can be smoothly established by the continuously variable transmissions.

21 Claims, 7 Drawing Sheets

TOROIDAL DRIVE SYSTEM FOR ELECTRIC VEHICLES

BACKGROUND OF THE INVENTION

1. Field of the Invention

The present invention relates to an electric power mechanism and, more particularly, to a drive system for driving an electric vehicle by a motor acting as a prime mover.

2. Related Art

An internal combustion engine employing a fossil fuel mainly of gasoline may cause environmental problems such as exhaust gases or noises. The fossil fuel per se has a fear of being exhausted in the near future. In recent years, therefore, there have been developed the electric vehicles which employ electric energy as the driving power source. The motor to be mounted on the electric vehicle has such output characteristics that its torque is substantially constant up to a predetermined number of revolutions (RPM) and is gradually lowered after the predetermined RPM is exceeded.

When the electric vehicle runs upslope, on the other hand, it demands a high torque at a low speed. For this demand, the motor to be mounted on the electric vehicle has to be of the low-speed high-torque type.

However, the motor of this type has a low maximum RPM and invites a reduction in the output at a high RPM so that it cannot satisfy all the performances demanded by the electric vehicle. Therefore, the electric vehicle has adopted a construction in which a transmission is arranged at the output side of the motor so that the output torque of the motor may be increased or decreased by the transmission and transmitted to the wheels. One example of the electric vehicle drive system, in which a reduction mechanism is arranged at the output side of the motor, is disclosed in Japanese Patent Laid-Open No. 42656/1996 (JP-A-8-42656).

The electric vehicle drive system, as disclosed, is provided with an electric motor, a reduction mechanism arranged at the output side of the electric motor, and a differential arranged at the output side of the reduction mechanism. Moreover, these electric motor, reduction mechanism and differential are arranged on a common axis.

In addition, the reduction mechanism and the differential are constructed of planetary type rollers. Specifically, the reduction mechanism is composed of: a first sun roller coupled to the output shaft of the electric motor; a first ring roller arranged around the outer circumference of the first sun roller; a plurality of first pinion rollers contacting with the first sun roller and the first ring roller; and a first carrier supporting the first pinion rollers rotatably.

On the other hand, the differential is composed of: a second ring roller fixed on the first carrier; a second sun roller arranged in the inner circumference of the second ring roller; a plurality of second pinion rollers contacting with the second ring roller and the second sun roller; and a second carrier supporting the second pinion rollers rotatably.

In the inside of the output shaft, there is inserted a righthand drive shaft, which is aligned with a lefthand drive shaft. Moreover, the second sun roller is coupled to the righthand drive shaft, and the second carrier is coupled to the lefthand drive shaft.

According to the conventional system thus far described, the torque of the output shaft of the electric motor is decelerated by the reduction mechanism and transmitted to the differential. The torque thus transmitted to the differential is distributed between the righthand drive shaft and the lefthand drive shaft to drive the electric vehicle.

A difference between the RPMs of the righthand and lefthand drive shafts is absorbed, if made by the resistance between the wheels and the road surface during the run of the electric vehicle, by the function of the differential. Moreover, since all those components of the electric motor, the reduction mechanism, the differential and the righthand and lefthand drive shafts are arranged on the common axis, the space for arranging the parts in a radial direction, i.e., in a direction perpendicular to the axis is minimized to offer an advantage for the size reduction.

In the conventional system, however, there are separately constructed the reduction mechanism for decelerating the output torque of the electric motor and the differential for absorbing the difference in the RPM between the righthand and lefthand drive shafts. This construction increases the number of parts and enlarges the space for arranging the parts in the axial direction. This raises a problem that the drive system is enlarged in size and increased in weight. Moreover, the construction of the reduction mechanism and the differential of the planetary type rollers enlarges the space for arranging the parts in the radial direction and increases the external diameter of the drive system.

SUMMARY OF THE INVENTION

A main object of the present invention is to reduce the size of a drive system for an electric vehicle by employing a device acting as both a transmission unit and a differential unit.

Another object of the present invention is to reduce the axial length or external diameter of the drive system by improving the arrangement of members composing the drive system.

In the present invention, therefore, a transmission mechanism having transmission rollers between an input disc and an output disc confronting each other is interposed between an electric power mechanism such as a motor and each of a first output shaft and a second output shaft. Here, the transmission rollers of each transmission mechanism are changed in their positions contacting with the individual discs when they are inclined.

In the drive system of the present invention, the transmission mechanism is provided for each of the first and second output shafts so that the gear ratio of the entire vehicle can be changed. Moreover, the RPMs of the first output shaft and the second output shaft can be made different by making the gear ratios of the individual transmission mechanism different, so that the differential rotation between the inner and outer wheels can be established at a turning time thereby to ensure a smooth turn. Still moreover, the driving forces of the left and right wheels can be made different to control the steering characteristics and improve the stability in the behavior of the vehicle.

In the present invention, on the other hand, the transmission mechanisms and the output shafts are arrayed on the common axis across the electric power mechanism such as the motor, so that the number of parts to be arrayed in the radial direction can be reduced to give a small external diameter to the drive system.

In the present invention, moreover, the motor can be employed as the electric power mechanism. When the motor is equipped with a stator having a coil wound thereon in a state to protrude in the axial direction, the input disc is arranged radially inside of the coil. With this construction, the axial length of the drive system can be reduced without any increase in the external diameter.

The transmission mechanism of the present invention is enabled to change the gear ratio by inclining the transmission rollers to change the radius of revolution of the points at which they contact with the input disc and the output disc. In this invention, this speed change can be effected on the basis of the control stroke of the output control mechanism such as the depression of an accelerator pedal. Alternatively, the speed change can also be effected on the basis of a vehicle speed or a steering angle.

In the present invention, moreover, when the electric power mechanism is made of a motor, its output efficiency can be improved by arranging it in a liquid-tight accommodation chamber.

In the present invention, furthermore, the transmission mechanism, as composed of the input disc, the output disc and the transmission rollers arranged between the two discs, can be exemplified by a toroidal type continuously variable transmission. In this example, there can be provided oil pressure chambers for thrusting the individual discs toward each other. The torques and RPMs of the first output shaft and the second output shaft can be individually controlled by controlling the oil pressures to be fed to those oil pressure chambers.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
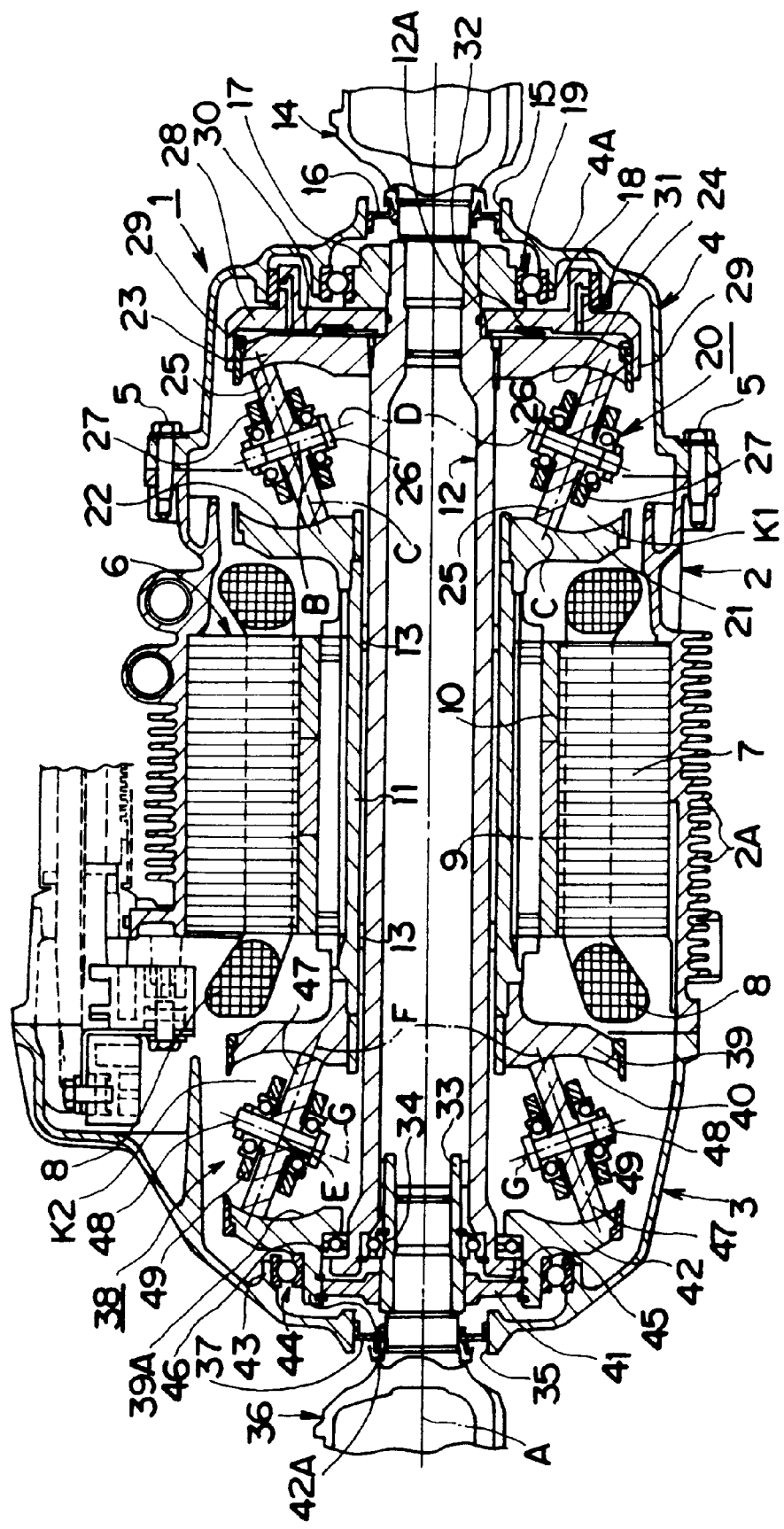
FIG. 1 is a section showing a first embodiment of a drive system for an electric vehicle according to the present invention.

The present invention will be described in detail with reference to the accompanying drawings. FIG. 1 is a section showing a first embodiment of a drive system for an electric vehicle. In FIG. 1, reference numeral 1 designates a hollow case. This hollow case 1 is constructed of a cylindrical body 2 arranged on a center axis, as indicated by "A", and covers 3 and 4 arranged to cover the openings of the body 2 at the two axial sides.

The cover 3 and the body 2 are fastened by the not-shown bolts, and the body 2 and the cover 4 are fastened by bolts 5. Here, radiation fins 2A are formed on the outer circumference of the body 2, and the case 1 is filled therein with the not-shown traction oil.

A motor 6 is accommodated in the body 2 for converting an electric energy into a rotating force. Hence, the motor 6 corresponds to an electric power mechanism of the present invention. This motor 6 is composed of a stator 7, a coil 8 and a rotor 9. The stator 7 is made by laminating a plurality of silicon steel sheets in the axial direction and fixing them on each other and is fixed on the inner circumference of the body 2.

Moreover, the coil 8 is wound on the stator 7. In the inner circumference of the stator 7, there is arranged the rotor 9 which is shaped cylindrical and made rotatable on the axis. A magnet 10 is mounted on the outer circumference of the rotor 9 while leaving a small clearance between the confronting faces of the magnet 10 and the stator 7. Moreover, the rotor 9 is fixedly fitted on the outer circumference of a rotary shaft 11 which is made rotatable on the axis. As a result, the rotary shaft 11 is rotated by energizing the coil 8 to control its current in the magnetic field which is established by the magnet 10 mounted on the rotor 9. The motor 6, as used herein, is exemplified by a PM motor, but a construction similar to the shown one can also be made according to the present invention by using a motor of another type such as a DC motor or an induction motor.

On the other hand, the rotary shaft 11 is a hollow one, in which is fitted an output shaft 12. The axial length of the rotary shaft 11 is set to a value substantially equal to the axial length of the body 2. Bearings 13 are arranged between the rotary shaft 11 and the output shaft 12 to allow them to rotate relative to each other.

The output shaft 12 is also a hollow one having a length set to extend from the inside of the cover 3 into the inside of the cover 4. As a result, the two ends of the output shaft 12 are protruded by predetermined extents to the outside of the rotary shaft 11. In the end portion of the output shaft 12 at the side of the cover 4, there is splined a first drive shaft 14.

On the center of an inward flange 4A of the cover 4, on the other hand, there is formed a bore 15 which is centered by an axis, as designated by "A", in which is arranged the righthand drive shaft 14 acting as a first output shaft. This righthand drive shaft 14 is connected to the not-shown wheel. On the inner circumference of the bore 15, on the other hand, there is fixed an oil seal 16 which is held at its seal lip in liquid-tight contact with the outer circumference of the righthand drive shaft 14.

In the threaded portion of the output shaft 12 at the side of the cover 4, moreover, there is fastened a nut-shaped fastener 17. In the inner face of the inward flange 4A of the cover 4, on the other hand, there is formed a cylindrical portion 18 which is made concentric with the bore 15 so that the fastener 17 is rotatably retained by a radial bearing 19 which is fitted in the inner circumference of the cylindrical portion 18.

At one end portion of the output shaft 12 inserted into the rotary shaft 11, that is, on the outer circumference of the end portion at the side of the cover 4, there is arranged a first continuously variable transmission (CVT) 20, which will be described in detail on its construction.

The first continuously variable transmission 20 is equipped with a first input disc 21 which is splined on the outer circumference of the rotary shaft 11. The first input disc 21 is arranged sideways of the axial end portion of the coil 8. On the side face of the first input disc 21 at the side of the bore 15, moreover, there is formed a transmission face 22 which is made annular on the axis. This transmission face 22 is a toroidal face, which is made fully toroidal in the shown example. This toroidal face can be made half-toroidal.

On the outer circumference of the output shaft 12, there is splined a first output disc 23. A transmission face 24 or a curved face matching the transmission face 22 is formed on the side face of the first output disc 23 at the side of the first input disc 21. A first cavity K1 is formed between the confronting faces of the transmission face 22 and the transmission face 24.

In the first cavity K1, there are arranged a plurality of power rollers 25 acting as first transmission rollers having disc shapes. The outer circumferences of the power rollers 25 are given toroidal faces matching the transmission faces 22 and 24 and are held in contact with the transmission faces 22 and 24 through oil films. Through the centers of the power rollers 25, moreover, there are fixedly extended shafts 26 which are rotatably retained by holders 27. Moreover, the intersections between the center lines C of the power rollers 25 in the thickness directions and the center lines D of the shafts 26 are arranged at the centers B of the cavities K1 which are defined by the transmission face 22 and the transmission faces 24, thereby to construct the so-called "full-toroidal type" first continuously variable transmission 20.

Between the nut-shaped fastener 17 and the first output disc 23 on the outer circumference of the output shaft 12, moreover, there is arranged a cylinder 28. This cylinder 28 is positioned and fixed in the axial direction by an annular step 12A of the output shaft 12 and the fastener 17.

On the outer circumference of the cylinder 28, there is formed a cylindrical portion 29 which is given a larger internal diameter than the external diameter of the first output disc 23. The first output disc 23 is arranged in the cylindrical portion 29. Between the first output disc 23 and the cylindrical portion 29 and between the first output disc 23 the output shaft 12, there are sandwiched O-rings. Thus, an oil pressure chamber 30 is formed between the cylinder 28 and the first output disc 23.

In the cylinder 28, on the other hand, there is formed an oil passage 31 communicating with the oil pressure chamber 30. Between the cylinder 28 and the first output disc 23, moreover, there is mounted an annular pre-load washer 32 for thrusting the first output disc 23 toward the first input disc 21 by its elastic force.

In the end portion of the output shaft 12 at the side of the cover 3, on the other hand, there is fitted a cylindrical holder 33. Between the output shaft 12 and the holder 33, there is arranged a radial bearing 34 which allows the output shaft 12 and the holder 33 to rotate relative to each other.

The cover 3 is so formed that its external diameter becomes the smaller as it leaves the farther from the body 2. A bore 35 is formed on the axis, as indicated by "A", at the farthest portion of the cover 3 from the body 2. Into this bore 35, there is inserted a lefthand drive shaft 36 acting as a second output shaft, which is splined in the holder 33. In the inner circumference of the bore 35, on the other hand, there is fitted an oil seal 37 which is held at its seal lip in liquid-tight contact with the outer circumference of the lefthand drive shaft 36. This lefthand drive shaft 36 is connected to the not-shown wheel such as the front wheel.

Around the other end portion of the output shaft 12 inserted in the rotary shaft 11, that is, around the end portion at the side of the cover 3, moreover, there is arranged a second continuously variable transmission (CVT) 38, which will be described in detailed on its construction.

This second continuously variable transmission 38 is equipped with a second input disc 39, which is splined on the outer circumference of the rotary shaft 11. The second input disc 39 is arranged sideways of the axial end portion of the coil 8. On the side face of a second input disc 42 at the side of the bore 35, there is formed a transmission face 40 which is made annular on the axis. This transmission face 40 is made fully toroidal in the shown example. This toroidal face can be made half-toroidal.

Between the radial bearing 34 on the outer circumference of the holder 33 and the bore 35, on the other hand, there is splined a hub 41, around which is fitted a second disc 42. A cylindrical portion 42A is formed on the axis on the side face of the second output disc 42 at the side of the bore 35.

This cylindrical portion 42A is given an internal diameter larger than that of the second output disc 42. On the inner face of the cover 3, there is formed a cylindrical portion 43 which is made on the axis, and the cylindrical portion 42A is held by a radial bearing 44 which is fitted in the cylindrical portion 42.

On the other hand, the end portion of the output shaft 12 at the side of the bore 35 is inserted into the cylindrical portion 42A of the second output disc 42. At the end portion of the output shaft 12 at the side of the bore 35, there is formed an outward flange 45. This outward flange 45 is given an external diameter smaller than the internal diameter of the cylindrical portion 42A and larger than the internal diameter of the second output disc 42. A thrust bearing 46 is arranged between the side face of the second output disc 42 and the side face of the outward flange 45.

On the side face of the second output disc 42 at the side of the second input disc 39, there is formed a transmission face 39A which is made annular on the axis. This transmission face 39A is a toroidal one symmetric to the transmission face 40. Between the transmission face 40 and the transmission face 39A, moreover, there is formed a second cavity K2 which is made annular in its entirety.

In the second cavity K2, there are arranged a plurality of power rollers 47 acting as second transmission rollers having disc shapes. The outer circumferences of the power rollers 47 are given curved faces matching the transmission faces 39A and 40 and are held in contact with the transmission faces 39A and 40 through oil films. Through the centers of the power rollers 47, moreover, there are fixedly extended shafts 48 which are rotatably retained by holders 49. Moreover, the intersections between the center lines F of the power rollers 47 in the thickness directions and the center lines G of the shafts 48 are arranged at the centers E of the cavities K2 which are defined by the transmission faces 39A and the transmission faces 40, thereby to construct the so-called "full- toroidal type" first continuously variable transmission 38.

As described above, the first continuously variable transmission 20 and the second continuously variable transmission 38, as located at the two axial sides of the motor 6, construct the full cavity type continuously variable transmission as a whole.

Figure 2:
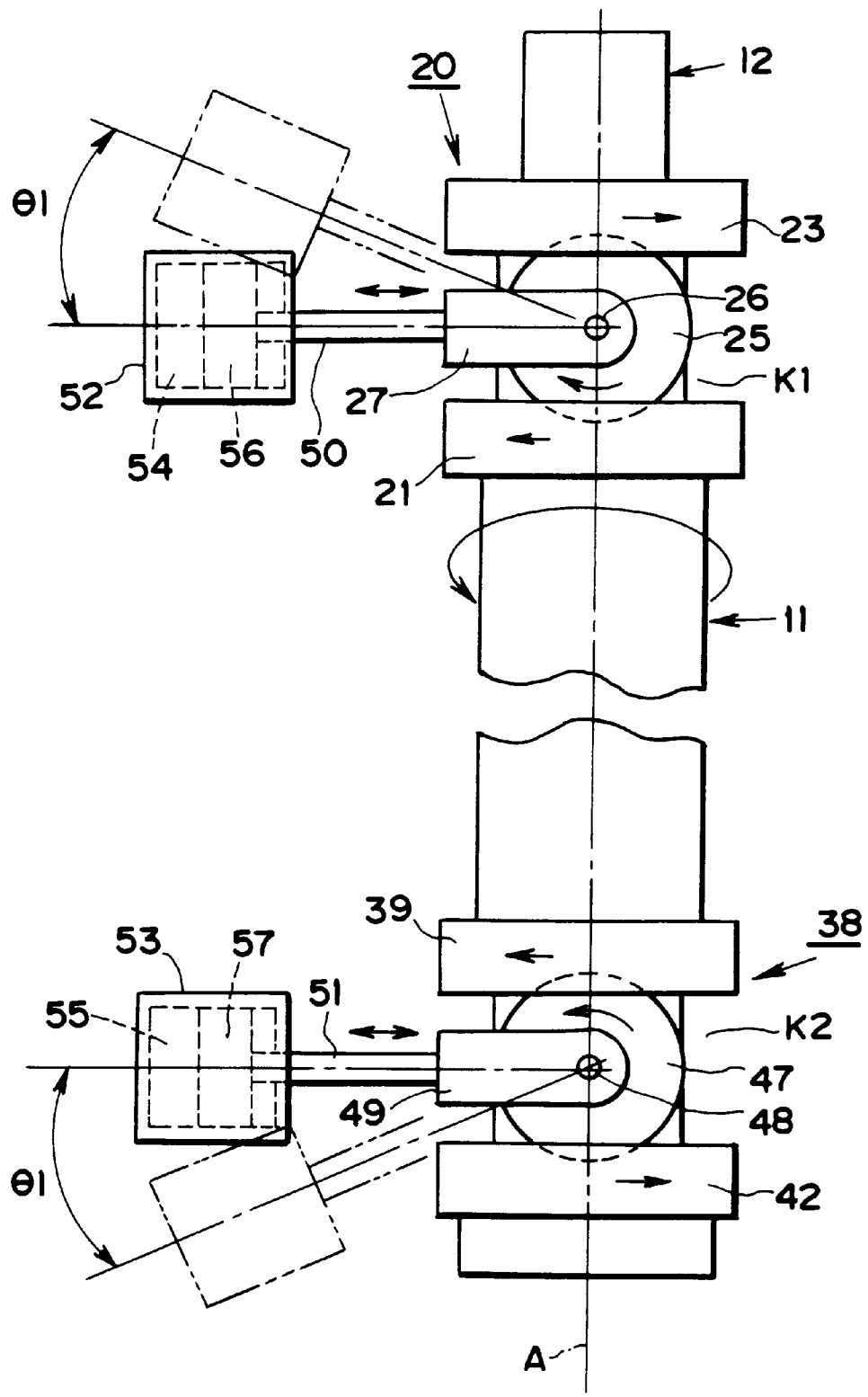
FIG. 2 is a conceptional diagram showing a control mechanism of a first continuously variable transmission and a second continuously variable transmission applied to FIG. 1.

FIG. 2 is a conceptional diagram showing a control mechanism of the first continuously variable transmission 20 and the second continuously variable transmission 38 thus far described. To the holders 27 and 49, respectively, there are connected variator shafts 50 and 51 which are made movable at a predetermined angle θ 1 with respect to their axes.

In the case 1, on here other hand, there are fixed hydraulic cylinders 52 and 53 which are provided with oil pressure chambers 54 and 55 and pistons 56 and 57, respectively. The variator shafts 50 and 51 are connected to these pistons 56 and 57, respectively. On the other hand, the holders 27 and 49 are so connected to the variator shafts 50 and 51 as to rotate and rock relative to them.

By controlling the oil pressures in the oil pressure chambers 54 and 55, therefore, the power rollers 25 and 47 can be moved circumferentially of the first cavity K1 or the second cavity K2. Moreover, the power rollers 25 and 47 can be individually changed in the angles of inclination with respect to the (not- shown) orthogonal lines perpendicular to the axis. The holder 27 and the variator shaft 50 correspond to a first support mechanism of the present invention, and the holder 49 and the variator 51 correspond to a second support mechanism.

Figure 3:
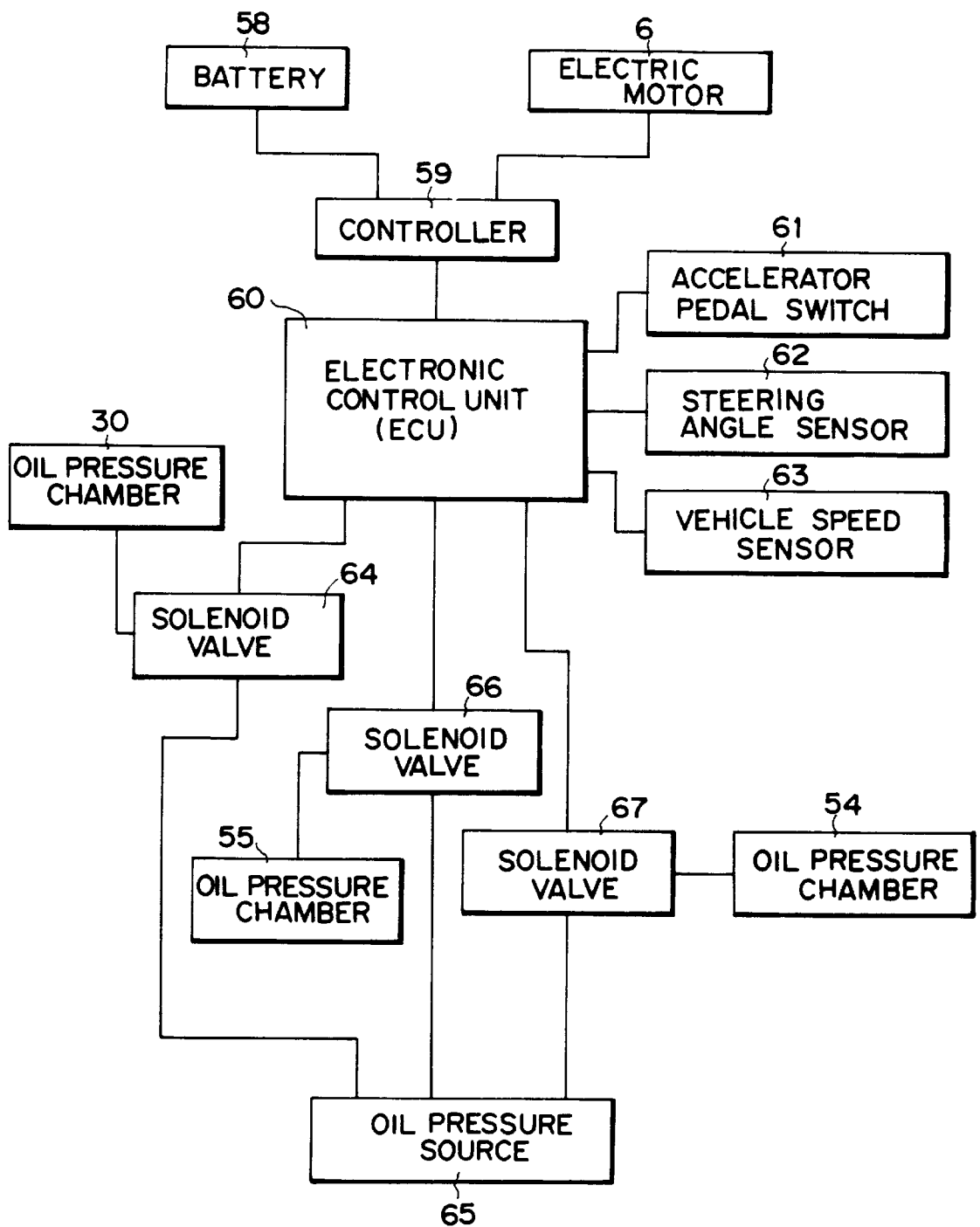
FIG. 3 is a block diagram showing an example of the construction of a control system applied to the first embodiment of the present invention.

FIG. 3 is a block diagram showing an example of the construction of a control system for the aforementioned drive system for an electric vehicle. A battery 58 for supplying a DC current to the aforementioned motor 6 is connected with a controller 59. The controller 59 to be used is equipped therein with a converter, when the motor 6 is a DC motor, and an inverter when the motor 6 is an AC motor.

The controller 59 is controlled by an electronic control unit (ECU) 60 so as to regulate the current or voltage to be fed from the battery 58 to the motor 6. The electronic control unit 60 is constructed of a microcomputer which is composed mainly of an input/output interface, memories (RAM and ROM) and a central processing unit (CPU).

The electronic control unit 60 is fed with the signal of an accelerator pedal switch 61 for detecting the degree of opening θ of an accelerator pedal, the signal of a steering angle sensor 62 for detecting the manipulated state of a steering handle, and the signal of a vehicle speed sensor 63 for detecting the vehicle speed of the electric vehicle. The electronic control unit 60 decides the running state of the electric vehicle in terms of the accelerator opening θ and the vehicle speed so that the controller 59 is controlled on the basis of the result of decision.

When there is provided a system such as a cruise control for keeping the vehicle speed constant, the degree of manipulation of an output control mechanism for controlling the output of the motor 6 by that system is adopted in place of the accelerator opening θ. Hence, the accelerator pedal or the replacing output control mechanism corresponds to an output manipulating mechanism of the present invention. On the other hand, the steering angle sensor 62 may detect the steered angle of the wheels in place of the steered angle of the steering handle. Moreover, the vehicle speed sensor 63 may be any, in short, if it can detect data corresponding to the vehicle speed and may detect the RPM of any of the rotary members constructing the power transmission train.

On the other hand, the oil pressure chamber 30 for actuating the first output disc 23 is connected through a solenoid valve 64 to an oil pressure source 65 such as a pump. The solenoid valve 64 is controlled in its duty ratio by the electronic control unit 61 to control the oil pressure to act upon the oil pressure chamber 30.

On the other hand, the oil pressure chambers 54 and 55 for controlling the actions of the power rollers 25 and 47 are connected separately through solenoid valves 66 and 67 to the oil pressure source 65. These solenoid valves 66 and 67 are individually controlled in their duty ratios by the electronic control unit 61 to control the oil pressures to act upon the oil pressure chambers 54 and 55. The aforementioned solenoid valves 66 and 67, oil pressure chambers 54 and 55, pistons 56 and 57, variator shafts 50 and 51 and holders 27 and 49 correspond to a first inclination angle control mechanism or a second inclination angle control mechanism of the present invention.

Here will be described the actions of the drive system thus constructed for the electric vehicle. First of all, the controller 59 is powered by the battery 58 to bring the motor 6 into a startable state. When the accelerator pedal is operated to augment the drive force, the current according to the accelerator opening θ is fed to the motor 6 so that the rotary shaft 11 rotates in the direction of arrow of FIG. 2.

Then, the elastic force of the pre-load washer 32 and the oil pressure of the oil pressure chamber 30 act upon the first output disc 23 so that the first output disc 23 is thrust toward the first input disc 21. As a result, a torque is set in its capacity according to the facial pressures of the contact faces between the power rollers 25 and the first input and output discs 21 and 23 and is transmitted by the shearing force of the traction oil existing between the abutting faces of those individual parts.

On the other hand, a reaction corresponding to the thrusting force to act upon the first output disc 23 is transmitted through the rotary shaft 11 to the second input disc 39 so that the second input disc 39 is thrust toward the second output disc 42. As a result, a torque is set in its capacity according to the facial pressures between the power rollers 47 and the second input and output discs 39 and 42 and is transmitted by the shearing force of the traction oil existing between the abutting faces of those individual parts.

Thus, the torque capacity of the first continuously variable transmission 20 and the torque capacity of the second continuously variable transmission 38 are substantially equalized. Then, the torques thus transmitted to the first output disc 23 and the second output disc 42 are transmitted through the righthand drive shaft 14 and the lefthand drive shaft 36 to the wheels thereby to run the electric vehicle.

Moreover, the gear ratio of the first continuously variable transmission 20 and the second continuously variable transmission 38 is set by the inclination angles of the power rollers 25 and 47 with respect to the orthogonal lines perpendicular to the axis. The inclination angles of the power rollers 25 and 47 are changed according to the balance between the oil pressures of the oil pressure chambers 54 and 55 and the drive reactions acting upon the power rollers 25 and 47 and are set to predetermined values.

As the oil pressures of the oil pressure chambers 54 and 55 are lowered, the power rollers 25 are moved toward the cylinder 52 by the contact resistances between the first input disc 21 and the power rollers 25. Likewise, the power rollers 47 are moved toward the cylinder 53.

Then, a difference between the rotating directions of the first input disc 21 and the power rollers 25 is established at the contact points between the first input disc 21 and the power rollers 25. As a result, a force is active to align the rotating directions of the power rollers 25 and the first input disc 21 so that the power rollers 25 are changed in their inclination angle with respect to the orthogonal lines while being inclined in the circumferential direction of the first cavity K1.

In this embodiment, the power rollers 25 are displaced in such a direction that the radius of revolution of the contact points between the power rollers 25 and the first input disc 21 from the axis, as indicated by "A" in FIG. 1, is reduced, and that the radius of revolution of the contact points between the power rollers 25 and the first output disc 23 is augmented. At the instant when the rotating direction of the power rollers 25 and the rotating direction of the first input disc 21 are aligned, the displacement of the power rollers 25 is ended to complete the speed change in the first continuously variable transmission 20.

At the side of the second continuously variable transmission 38, on the other hand, the power rollers 47 are displaced by the actions similar to the aforementioned ones in a direction to reduce the radius of revolution of the contact points between the power rollers 47 and the second input disc 39 and to augment the radius of revolution of the contact points between the power rollers 47 and the second output disc 42, as shown in FIG. 1. At the instant when the rotating direction of the power rollers 47 and the rotating direction of the second input disc 39 are aligned, the displacement of the power rollers 47 is ended to complete the speed change in the second continuously variable transmission 38.

When the displacements of the power rollers 25 and 47 are ended, as described above, the gear ratio of the first continuously variable transmission 20 and the second continuously variable transmission 38 takes a larger value. In other words, the torque of the rotary shaft 11 is decelerated and transmitted to the first drive shaft 14 and the second drive shaft 36.

When the oil pressures in the oil pressure chambers 54 and 55 are raised, the power rollers 25 are moved apart from the cylinder 52, and the power rollers 47 are moved apart from the cylinder 53.

Then, the power rollers 25 are inclined with respect to the orthogonal lines while being inclined in the circumferential direction of the first cavity K1. At the instant when the power rollers 25 and the first input disc 21 are aligned in the rotating directions, the displacement of the power rollers 25 is ended to complete the speed change in the first continuously variable transmission 20. In this embodiment, the power rollers 25 are moved in the direction in which the radius of revolution of the contact points at the side of the first output disc 23 becomes smaller than that of the contact points at the side of the first input disc 21.

Likewise, the power rollers 47 are displaced in the radial direction and in the circumferential direction of the second input disc 39. At the instant when the power rollers 47 and the second input disc 39 are aligned in the rotating directions, the displacement of the power rollers 47 is ended to complete the speed change in the second continuously variable transmission 38. In this embodiment, the power rollers 47 are moved in the direction in which the radius of revolution of the contact points at the side of the second output disc 42 becomes smaller than that of the contact points at the side of the second input disc 39.

When the displacements of the power rollers 25 and 47 are ended, as described above, the gear ratio of the first continuously variable transmission 20 and the second continuously variable transmission 38 takes a smaller value so that the torque of the rotary shaft 11 is accelerated and transmitted to the first drive shaft 14 and the second drive shaft 36.

When the electric vehicle is to be turned rightwards by manipulating the steering handle while it is running, a yawing moment is established in the vehicle to start the turn. Then, the RPM of the outer wheel exceeds that of the inner wheel so that a torsional torque, i.e., a braking force acts upon the drive line, as located at the righthand side of FIG. 1. As a result, the braking force of the righthand drive shaft 14, as connected to the inner wheel, is transmitted through the output shaft 12 to the first output disc 23 thereby to augment the reaction acting upon the holder 27.

Then, the power rollers 25 are moved toward the cylinder 52 against the oil pressure in the oil pressure chamber 54 so that they are inclined in the circumferential direction of the first cavity K1 with respect to the orthogonal lines by actions similar to the aforementioned ones. As a result, the power rollers 25 are moved in the direction in which the radius of revolution of the contact points between the power rollers 25 and the first input disc 21 becomes smaller than that of the contact points between the power rollers 25 and the first output disc 23.

During the actions described above, on the other hand, the RPM of the outer wheel is augmented so that the RPM of the second output disc 42 exceeds that of the second input disc 39. Then, the reaction to act upon the holder 49 is decreased to move the power rollers 47 apart from the cylinder 53 so that the power rollers 47 are displaced in the radial direction and in the circumferential direction of the second input disc 39 by actions similar to the aforementioned ones. As a result, the power rollers 47 are moved in such a direction that the radius of revolution of the contact points between the power rollers 47 and the second input disc 39 exceeds that of the contact points between the power rollers 47 and the second output disc 42. Thus, there is absorbed the differential rotation between the wheel attached to the righthand drive shaft 14 and the wheel attached to the lefthand drive shaft 36.

When the steering handle is steered to the straight state, the power rollers 25 and 47 are displaced while being inclined in the circumferential directions of the first cavity K1 and the second cavity K2, on the basis of the reactions resulting from the RPM difference between the first input disc 21 and the first output disc 23 and the RPM difference between the second input disc 39 and the second output disc 42, so that the lefthand and righthand power rollers 25 and 47 take equal inclination angles.

When the electric vehicle is to be turned leftwards, the wheel, as attached to the lefthand drive shaft 36, acts as the inner wheel for the similar actions, and the wheel, as attached to the righthand drive shaft 14, acts as the outer wheel for the similar actions.

When the first continuously variable transmission 20 and the second continuously variable transmission 38 are caused to function as the differentials by steering the steering handle, as described above, the oil pressures in the oil pressure chambers 54 and 55 could be automatically controlled by the electronic control unit 60 on the basis of the signals which are detected by the steering angle sensor 62 and the vehicle speed sensor 63, thereby to control the inclination angles of the power rollers 25 and 47 with respect to the orthogonal lines. With these controls, the individual RPMs of the inner wheel and the outer wheel can be individually set according to the turning radius of the electric vehicle thereby to improve the turning performance better.

Thus, in the first embodiment, the first continuously variable transmission 20 and the second continuously variable transmission 38 function as both the transmissions and the differentials. As a result, the number of parts to be employed in the drive system can be made as small as possible to contribute to reductions in the size and weight of the drive system.

In the first embodiment, moreover, the first input disc 21, the power rollers 25 and the first output disc 23 are arranged in the axial direction at one side of the motor 6 whereas the second input disc 39, the power rollers 47 and the second output disc 42 are arranged in the axial direction at the other side of the motor 6. As a result, the number of parts to be arrayed in the (radial) direction perpendicular to the axis can be reduced to suppress the parts arranging space in the radial direction thereby to reduce the external diameter of the drive system.

In the first embodiment, still moreover, the program of the electronic control unit 60 can be so set that the oil pressures P in the oil pressure chambers 54 and 55 may be determined in the form of a function (P=f(θ)) employing the opening θ of the accelerator pedal as a parameter. With the control program thus set, the first continuously variable transmission 20 and the second continuously variable transmission 38 are automatically controlled to augment their gear ratio when the accelerator opening θ is increased to raise the output torque of the motor 6. When the accelerator opening θ is decreased to lower the output torque of the motor 6, on the other hand, the first continuously variable transmission 20 and the second continuously variable transmission 38 are automatically controlled to lower their gear ratio. In short, the output of the motor 6 can be increased/decreased according to either the state of the road being followed by the electric vehicle or the intention of the driver for acceleration/deceleration, thereby to improve the drive performance of the drive system better.

In the first embodiment, on the other hand, the torque is transmitted by the shearing force of the traction oil which exists between the contact faces of the parts constructing the first continuously variable transmission 20 and the second continuously variable transmission 38. This torque transmission raises effects that the vibration can be less than that of the construction in which the speed changes or the differential operations are carried out by using the gear mechanism, and that no noise is made.

In the first embodiment, on the other hand, the output shaft 12 and the cylinder 28 are fixed in the axial direction by the fastener 17, and the thrust bearing 46 is arranged between the second output disc 42 and the outward flange of the output shaft 12. As a result, while the torques are being transmitted in the first continuously variable transmission 20 and the second continuously variable transmission 38, both the thrust load acting as the reaction upon the first output disc 23 and the thrust load acting as the reaction upon the second output disc 42 are transmitted to the output shaft 12 so that they are offset by each other. This makes it unnecessary to arrange the thrust bearing for receiving the thrust load at the side of the case 1, so that the number of parts can be made as small as possible to reduce the size and weight of the drive system.

Since the thrust loads are offset, as described above, the radial bearings 18 and 43 are subjected to only the radial loads but no load in the thrust direction so that they capacities can be made as small as possible. Moreover, the strengths of the covers 3 and 4 for retaining the radial bearings 18 and 43 can be made as low as possible.

Figure 4:
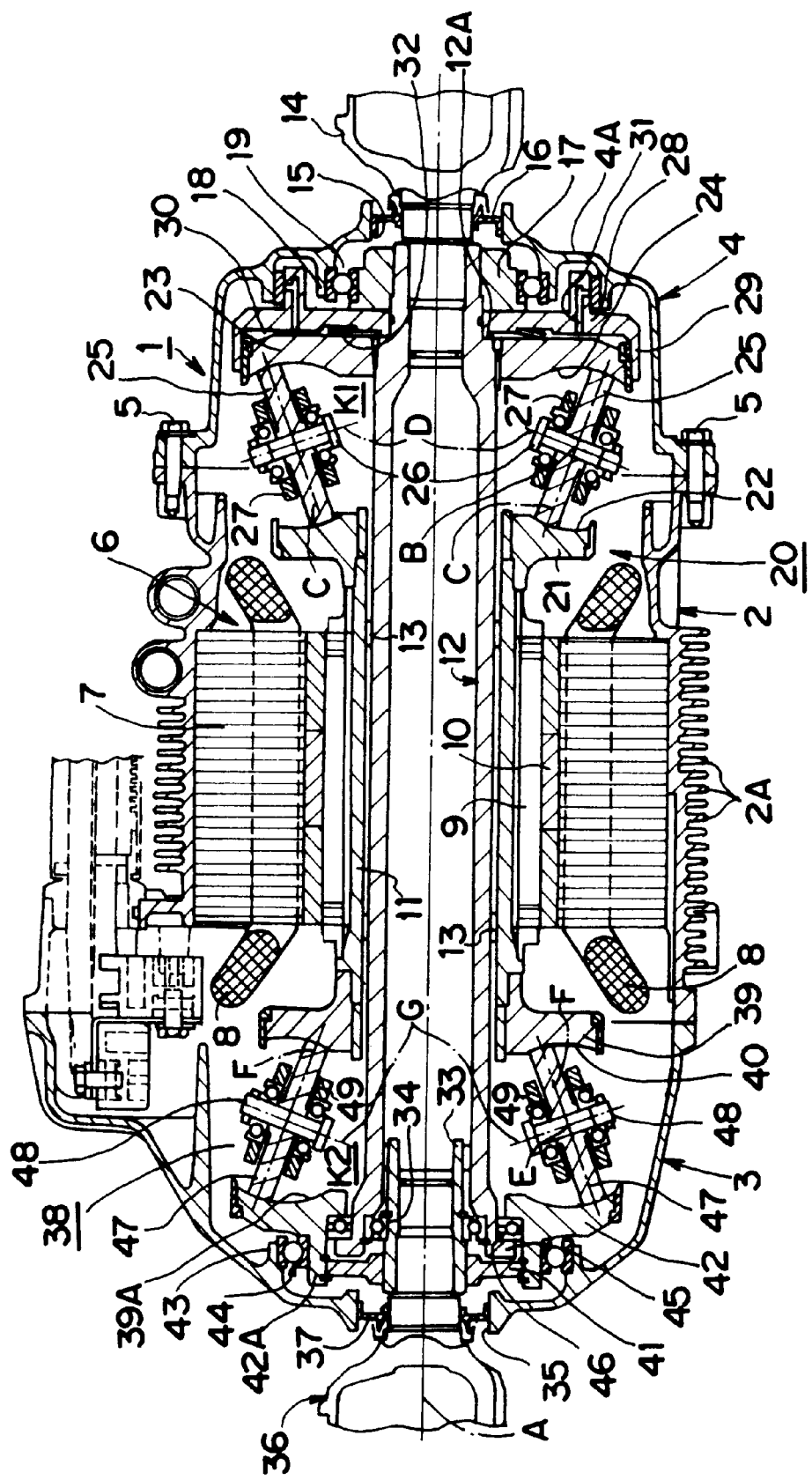
FIG. 4 is a section showing a second embodiment of the drive system for an electric vehicle according to the present invention.

FIG. 4 is a section showing a second embodiment of the drive system according to the present invention. In this second embodiment, the first input disc 21 is given an external diameter smaller than that of the first output disc 23, and the second input disc 39 is given an external diameter smaller than that of the second output disc 42.

As a result, the maximum radius of revolution of the contact points between the first input disc 21 an the power rollers 25 is set smaller than that of the contact points between the first output disc 23 and the power rollers 25. Moreover, the maximum radius of revolution of the contact points between the second input disc 39 and the power rollers 47 is set smaller than that of the contact points between the second output disc 42 and the power rollers 47. In addition, the first input disc 21 and the second input disc 39 are arranged in the inner circumference of the axial end portion of the coil 8, that is, between the end portion and the rotary shaft 11. The remaining constructions are similar to those of the first embodiment so that their description is omitted.

Actions similar to those of the first embodiment can be achieved in this second embodiment, too. In the second embodiment, on the other hand, the first input disc 21 and the second input disc 39 are arranged between the axial end portion of the coil 8 an the rotary shaft 11. As a result, the space for arranging the motor 6 in the axial direction and the space for arranging the first continuously variable transmission 20 and the second continuously variable transmission 38 can be partially overlapped to shorten the drive system.

In the second embodiment, moreover, the maximum radius of revolution of the contact points between the first input disc 21 and the power rollers 25 is set smaller than that of the contact points between the first output disc 23 and the power rollers 25. Moreover, the maximum radius of the contact points between the second input disc 39 and the power rollers 47 is set smaller than that of the contact points between the second output disc 42 and the power rollers 47.

As a result, the ratio of the region, in which a deceleration control can be made by the displacements of the power rollers 25 and 47, becomes larger than that of the region in which an acceleration control can be made. In the motor 6 mounted on the electric vehicle, however, the state, in which the demanded gear ratio is more than "1", that is, the drive state, in which the torque is decelerated and transmitted, occurs so frequently that the run of the electric vehicle is less troubled than in the first embodiment even if the shift control region is restricted.

Figure 5:
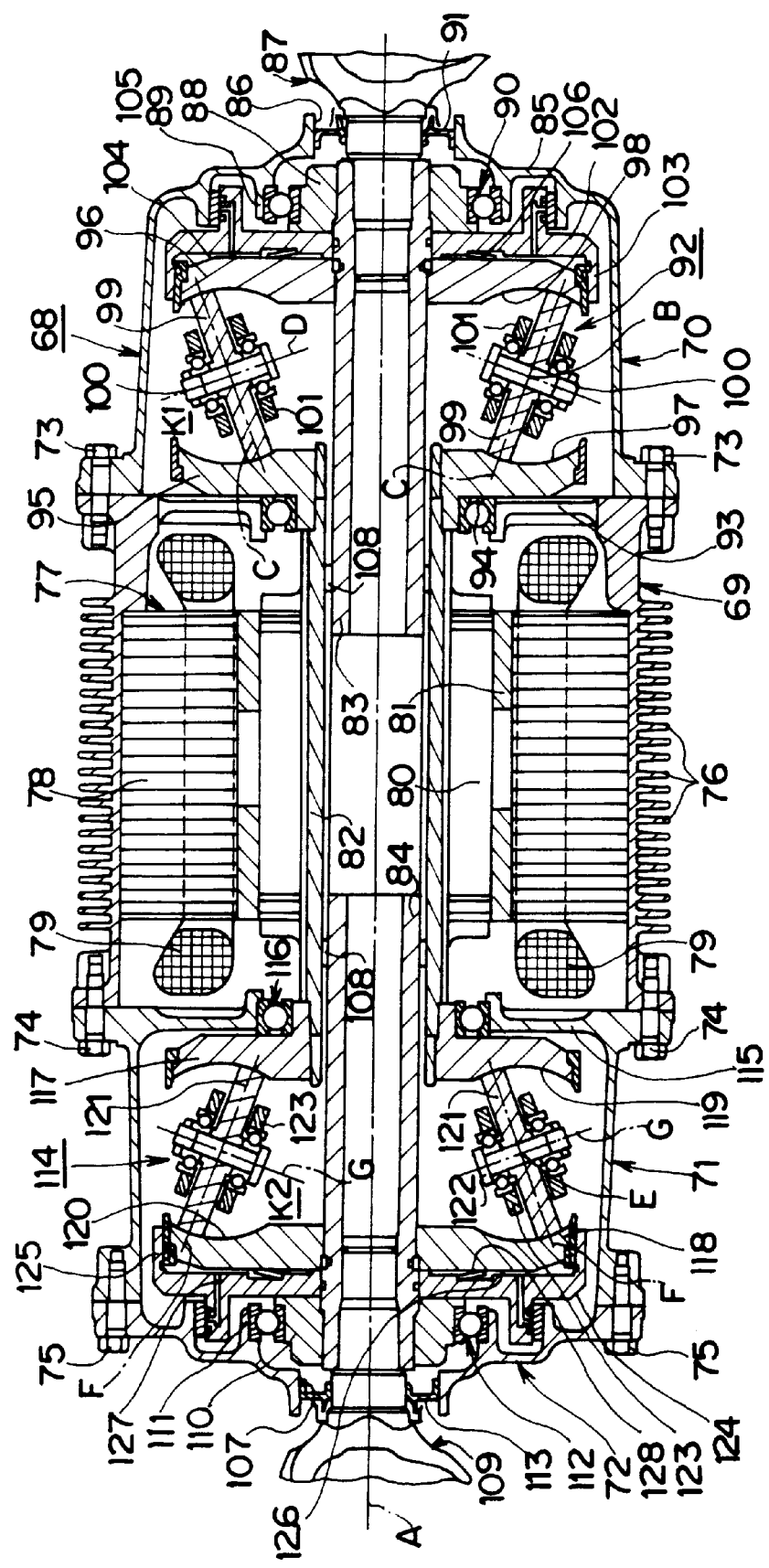
FIG. 5 is a section showing a third embodiment of the drive system for an electric vehicle according to the present invention.

FIG. 5 is a section showing a third embodiment of the drive system for the electric vehicle. This third embodiment is different from the first or second embodiment in that the first output disc and the second output disc can move separately in the axial direction. Specifically, reference numeral 68 appearing in FIG. 5 designates a hollow case. This hollow case 68 is constructed of a cylindrical body 69 arranged on a center axis, and a cover 70 arranged in a position to cover one of the openings of the body 69, a cylindrical member 71 mounted on the other opening of the body 69, and an annular cover 72 covering the opening of the cylindrical member 71.

These cover 70 and body 69 are fastened and fixed by bolts 73, and the body 69 and the cylindrical member 71 are fastened and fixedly by bolts 74. Moreover, the cylindrical member 71 and the cover 72 are fastened and fixed by bolts 75. Here, radiation fins 76 are formed on the outer circumference of the body 69, and the case 68 is filled therein with the not-shown traction oil.

A motor 77, as accommodated in the body 69, corresponds to an electric power mechanism of the present invention for converting an electric energy into a rotating force. This motor 77 is composed of a stator 78, a coil 79 and a rotor 80. The stator 78 is made by laminating a plurality of silicon steel sheets in the axial direction and fixing them on each other and is fixed on the inner circumference of the body 69.

Moreover, the coil 79 is wound on the stator 78. In the inner circumference of the stator 78, there is arranged the rotor 80 which is shaped cylindrical and made rotatable on the axis. A magnet 81 is mounted on the outer circumference of the rotor 80 while leaving a small clearance between the confronting faces of the magnet 81 and the stator 78. Moreover, the rotor 80 is fixedly fitted on the outer circumference of a rotary shaft 82 which is made rotatable on the axis. As a result, the rotary shaft 82 is rotated by energizing the coil 79 to establish a magnetic field by the stator 78.

On the other hand, the rotary shaft 82 is a hollow shaft which is given an axial length larger than that of the body 69. The rotary shaft 82 is so substantially arranged in the body 69 that its one end is extended to the inside of the cover 70 whereas its other end is extended to the inside of the cylindrical member 71.

Into the inside of the rotary shaft 82, moreover, there are inserted a first output shaft 83 and a second output shaft 84. Of these, the first output shaft 83 is so arranged at the side of the cover 70 that its end portion is extended to the vicinity of a bore 86 of an inward flange 85 of the cover 70.

On the other hand, a bearing 108 is arranged between the rotary shaft 82 and the first output shaft 83 to allow them to rotate relative to each other. The first output shaft 83 is a hollow shaft, and a righthand drive shaft 87 acting as a first drive shaft is inserted from the outside into the inside of the cover 70. The righthand drive shaft 87 is splined in the first output shaft 83. On the other hand, the righthand drive shaft 87 is connected to the not-shown wheel.

In the threaded portion of the first output shaft 83 at the side of the bore 86, moreover, there is fixed a nut-shaped fastener 88. In the inner face of the inward flange 85 of the cover 70, on the other hand, there is formed a cylindrical portion 89 on the axis so that the fastener 88 is retained by a radial bearing 90 which is fitted in the inner circumference of the cylindrical portion 89. On the inner circumference of the bore 86, on the other hand, there is fixed an oil seal 91 which is held at its seal lip in liquid-tight contact with the outer circumference of the righthand drive shaft 87. Around the outer circumference of one end portion of the first output shaft 83 inserted in the rotary shaft 82, there is arranged a first continuously variable transmission (CVT) 92.

Here will be described in detail the construction of the first continuously variable transmission 92. An inward flange 93 is formed on the inner circumference of the end portion of the body 69 at the side of the cover 70, and a radial bearing 94 is mounted in the inner circumference of the inward flange 93.

The first continuously variable transmission 92 is equipped with a first input disc 95 having an annular shape and a first output disc 96 having an annular shape, of which the first input disc 95 is splined on the outer circumference of the rotary shaft 82. The first input disc 95 is retained by the radial bearing 94, and an annular transmission face 97, as centered by an axis indicated by "A", is formed on the side face of the first input disc 95 at the side of the bore 86. The transmission face 97 is formed into a toroidal face.

On the other hand, the first output disc 96 is splined on the outer circumference of the first output shaft 83. A transmission face 98 symmetric to the transmission face 97 is formed on the side face of the first output disc 96 at the side of the first input disc 95. A first cavity K1 having an annular shape is formed between the confronting faces of the transmission face 97 and the transmission face 98.

In the first cavity K1, there are arranged a plurality of power rollers 99 acting as first transmission rollers having disc shapes. The outer circumferences of the power rollers 99 are given curved faces matching the transmission faces 97 and 98 and are held in contact with the transmission faces 97 and 98 through oil films. Through the centers of the power rollers 99, moreover, there are fixedly extended shafts 100 which are rotatably retained by holders 101. Moreover, the intersections between the center lines C of the power rollers 99 in the thickness directions and the center lines D of the shafts 100 are arranged at the centers B of the cavities K1 which are defined by the transmission faces 97 and the transmission faces 98, thereby to construct the so-called "full-toroidal type" first continuously variable transmission 92.

Between the nut-shaped fastener 88 and the first output disc 96 on the outer circumference of the first output shaft 83, moreover, there is arranged an annular cylinder 102. On the outer circumference of the cylinder 102, there is formed a cylindrical portion 103 which is given a larger internal diameter than the external diameter of the first output disc 96. The first output disc 96 is arranged in the cylindrical portion 103.

Between the first output disc 96 and the cylindrical portion 103 and between the first output disc 96 and the first output shaft 83, there are sandwiched O-rings. Thus, an oil pressure chamber 104 is formed between the cylinder 102 and the first output disc 96.

In the cylinder 102, on the other hand, there is formed an oil passage 105 communicating with the oil pressure chamber 104. Between the cylinder 102 and the first output disc 96, moreover, there is mounted an annular preload washer 106 for thrusting the first output disc 96 toward the first input disc 95 by its elastic force.

On the other hand, the second output shaft 84 is so arranged at the side of the cylindrical member 71 that its end portion is extended to the vicinity of a bore 107 of the cover 72. A bearing 108 is arranged between the rotary shaft 82 and the second output shaft 84 to allow them to rotate relative to each other.

The second output shaft 84 is a hollow shaft, and a lefthand drive shaft 109 acting as a second drive shaft is inserted from the outside into the inside of the cover 72. The lefthand drive shaft 109 is splined in the second output shaft 84. On the other hand, the lefthand drive shaft 109 is connected to the not-shown wheel.

In the threaded portion of the second output shaft 84 at the side of the bore 107, moreover, there is fixed a nut-shaped fastener 110. In the inner face of the cover 72, on the other hand, there is formed a cylindrical portion 111 on the axis so that the fastener 110 is retained by a radial bearing 112 which is fitted in the inner circumference of the cylindrical portion 111. On the inner circumference of the bore 107, on the other hand, there is fixed an oil seal 113 which is held at its seal lip in liquid-tight contact with the outer circumference of the lefthand drive shaft 109. Around the outer circumference of one end portion of the second output shaft 84 inserted in the rotary shaft 82, there is arranged a second continuously variable transmission (CVT) 114.

Here will be described in detail the construction of the second continuously variable transmission 114. An inward flange 115 is formed on the inner circumference of the end portion of the cylindrical member 71 at the side of the body 69, and a radial bearing 116 is mounted in the inner circumference of the inward flange 115.

The second continuously variable transmission 114 is equipped with a second input disc 117 having an annular shape and a second output disc 118 having an annular shape, of which the second input disc 117 is splined on the outer circumference of the rotary shaft 82. The second input disc 118 is retained by the radial bearing 116, and an annular transmission face 119, as centered by the axis, is formed on the side face of the second input disc 117 at the side of the cover 72. The transmission face 119 is formed into a toroidal face.

On the other hand, the second output disc 118 is splined on the outer circumference of the second output shaft 84. A transmission face 120 symmetric to the transmission face 119 is formed on the side face of the second output disc 118 at the side of the second input disc 117. A second cavity K2 having an annular shape is formed between the confronting faces of the transmission face 119 and the transmission face 120.

In the second cavity K2, moreover, there are arranged a plurality of power rollers 121 acting as second transmission rollers having disc shapes. The outer circumferences of the power rollers 121 are given curved faces matching the transmission faces 119 and 120 and are held in contact with the transmission faces 119 and 120 through oil films. Through the centers of the power rollers 121, moreover, there are fixedly extended shafts 122 which are rotatably retained by holders 123. Moreover, the intersections between the center lines F of the power rollers 123 in the thickness directions and the center lines G of the shafts 122 are arranged at the centers E of the cavities K2 which are defined by the transmission faces 119 and the transmission faces 120, thereby to construct the so-called "full-toroidal type" second continuously variable transmission 114.

Between the fastener 110 and the second output disc 118 on the outer circumference of the second output shaft 84, moreover, there is arranged an annular cylinder 124. On the outer circumference of the cylinder 124, there is formed a cylindrical portion 125 which is given a larger internal diameter than the external diameter of the second output disc 118. The second output disc 118 is arranged in the cylindrical portion 125.

Between the second output disc 118 and the cylindrical portion 125 and between the second output disc 118 and the second output shaft 84, there are sandwiched O-rings. Thus, an oil pressure chamber 126 is formed between the cylinder 124 and the second output disc 118.

In the cylinder 124, on the other hand, there is formed an oil passage 127 communicating with the oil pressure chamber 126. Between the cylinder 124 and the second output disc 118, moreover, there is mounted an annular pre-load washer 128 for thrusting the second output disc 118 toward the second input disc 117 by its elastic force. Here, the power rollers 99 and 121 are controlled by a control mechanism similar to that of FIG. 2, that is, the cylinders, oil pressure chambers, the pistons and the variator shafts.

In this third embodiment, when the motor 77 is activated, the output torque of the rotary shaft 82 is transmitted to the first continuously variable transmission 92 and the second continuously variable transmission 114 so that the torques are transmitted to the righthand drive shaft 87 and the lefthand drive shaft 109, as in the torque transmissions of the first embodiment, to run the electric vehicle.

On the other hand, the speed changing functions and the differential functions of the first continuously variable transmission 92 and the second continuously variable transmission 114 are performed as in the first embodiment. As a result, actions and effects similar to those of the first embodiment can also be achieved from the third embodiment. In the third embodiment, moreover, the first output disc 96 and the second output disc 118 can be moved separately of each other in the axial direction.

When the oil pressures in the oil pressure chamber 104 and the oil pressure chamber 126 are separately controlled, the torque capacity of the first continuously variable transmission 92 and the torque capacity of the second continuously variable transmission 114 can be controlled independently. Accordingly, it is possible to control the difference torque between a right drive wheel and left drive wheel, for example. As a result, the running performance of the electric vehicle is improved and the wasteful power loss at the power rollers 99 and 121 is avoided.

The foregoing first to third embodiments employ the full-toroidal continuously variable transmission, which can be replaced by a half-toroidal continuously variable transmission. This half-toroidal continuously variable transmission is constructed such that the intersection between the center line of the power rollers in the thickness direction and the center line of the shape is arranged at a position other than the center of an arc forming the transmission faces. In other words, the transmission faces or toroidal faces of the continuously variable transmission are formed to maximize the gap between the outer circumferential end portions of the transmission faces, i.e., the gap between the end portions of the outermost circumference, as measured from the center of rotation of the transmission faces.

When this half-toroidal continuously variable transmission is employed, the function to automatically control the gear ratio between the first and second continuously variable transmissions cannot be achieved if a differential rotation occurs between the first drive shaft and the second drive shaft. On the basis of both the steered angle of the steering handle, as measured by the steering angle sensor 62, and the vehicle speed detected by the vehicle speed sensor 63, therefore, the RPM ratio between the lefthand and righthand wheels is arithmetically processed by the electronic control unit 60.

On the basis of the RPM ratio thus calculated, the inclination angle of the power rollers of the first continuously variable transmission and the inclination angle of the power rollers of the second continuously variable transmission are calculated to control the actuators for controlling the power rollers on the basis of the result of calculations. As a result, the power rollers of the first continuously variable transmission and the power rollers of the second continuously variable transmission are rotationally decelerated/accelerated to smoothen the differential rotations of the lefthand and righthand wheels thereby to improve the turning performance of the vehicle.

The first to third embodiments could adopt the construction in which the first continuously variable transmission and the second continuously variable transmission are arranged in the hollow rotary shaft of the electric motor. If this construction is adopted, the space for arranging the parts in the axial direction can be further reduced to make the size of the drive system smaller in the axial direction.

The drive system of the present invention may be applied to the front wheels and/or the rear wheels of the electric vehicle. Another application can be made to a hybrid type electric vehicle in which the motor and another prime mover such as an internal combustion engine. Moreover, the electric power mechanism can be exemplified by a motor generator having a power function and a regenerative function.

In order to separately control the torque capacity of the first continuously variable transmission 92 and the second continuously variable transmission 114, moreover, the third embodiment can be provided with a mechanism for moving the first input disc 95 and the second input disc 117 in the axial direction.

Figure 6:
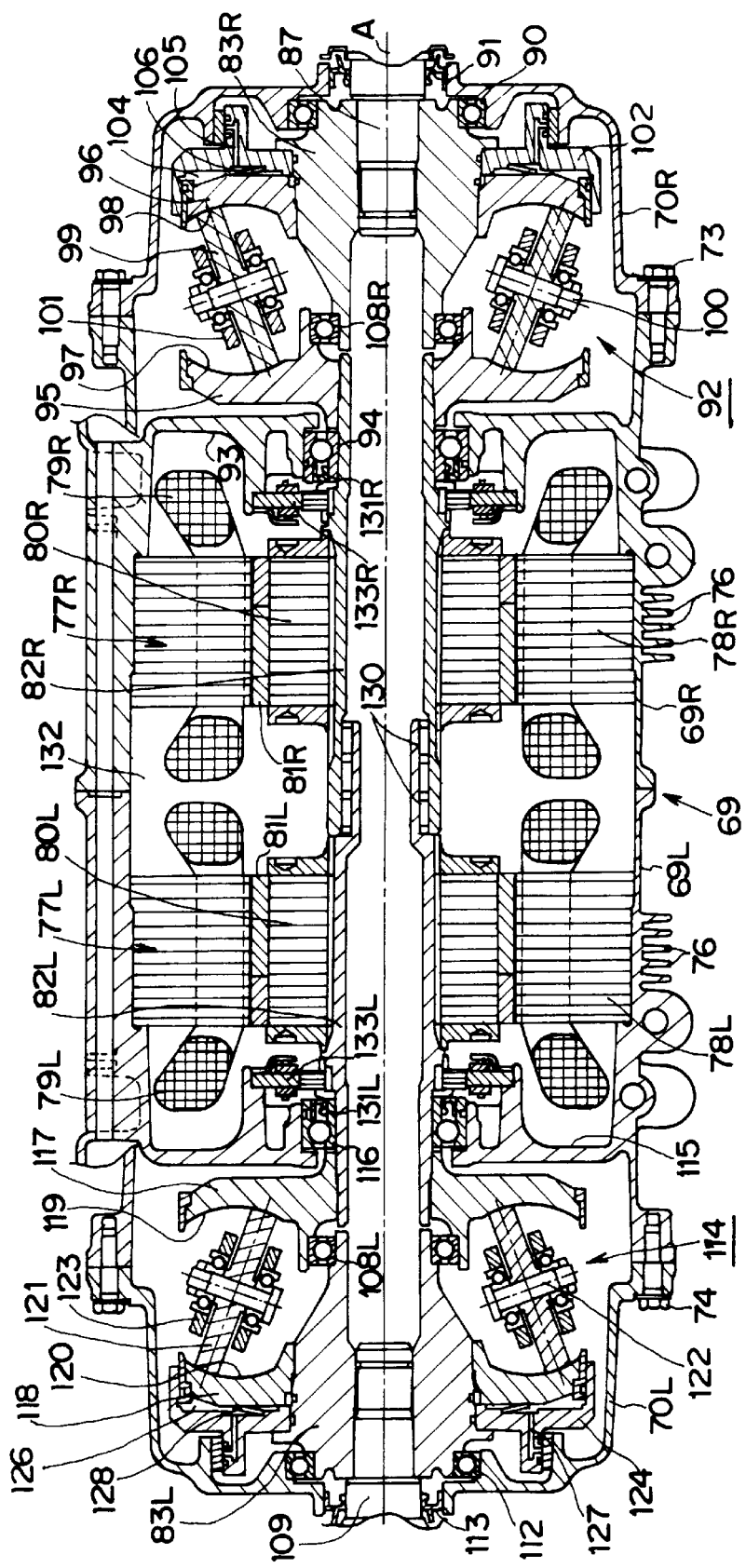
FIG. 6 is a section showing a fourth embodiment of the drive system for an electric vehicle according to the present invention.

A fourth embodiment of the present invention will be described with reference to FIG. 6. This fourth embodiment, as shown in FIG. 6, is constructed such that two motors are provided for the left and right wheels and accommodated in liquid-tight motor cases to prevent the motor output characteristics from being influenced by the traction oil. As a result, the fourth embodiment is made substantially completely symmetric with respect to the longitudinal direction while including the structure of the case 68. The fourth embodiment will be described in contrast to the foregoing third embodiment, but the same portions as those of FIG. 3 will not be described by designating them by the same reference numerals.

The body 69 forming the case 68 is halved at its axial center portion into body portions 69R and 69L, in which are arranged motors 77R and 77L. These motors 77R and 77L are composed, like the motor shown in FIG. 5, of stators 78R and 78L equipped with coils 79R and 79L, and rotors 80R and 80L equipped with magnets 81R and 81L. Rotary shafts (or rotor shafts) 82R and 82L are individually fitted and fixed in the inner circumferences of the rotors 80R and 80L. Thus, the motors 77R and 77L correspond to the electric power mechanism of the present invention.

Those rotary shafts 82R and 82L are made axially longer than the rotors 80R and 80L such that their end portions, as located at the center side of the drive system, are fitted one in the other and such that radial bearings 130 are arranged inbetween. Here, these fitted portions may be sealed liquid-tight by a sealing member such as an oil seal. The other end portions of the rotary shafts 82R and 82L are extended through the inward flanges (or partitions) 93 and 115 which are integrated with the body portions 69R and 69L, and these extending-through portions are rotatably supported by the radial bearings 94 and 116. Here, these radial bearings 94 and 116 are equipped with oil seals 131R and 131L, as shown, at the sides of the motors 77R and 77L. As a result, the inside of the body 69 is sealed up liquid-tight to define a motor chamber 132. Between the rotary shafts 82R and 82L and the inward flanges 93 and 115, on the other hand, there are mounted resolvers 133R and 133L. These resolvers 133R and 133L are arranged in the motor chamber 132.

Output hubs 83R and 83L, as corresponding to the aforementioned output shafts 83 and 84, are rotatably supported by the radial bearings 90 and 112 in left and right covers 70R and 70L. Here, these covers 70R and 70L are made so similar to the cover 70 in the foregoing third embodiment that they are formed into cylindrical shapes having bores in the central portion of the inward flanges and that they are fixed on the end portions of the body portions 69R and 69L by the bolts 73 and 74. On the other hand, the output hubs 83R and 83L are made of axially shorter hollow members which are extended at their leading end portions toward the leading end portions of the rotary shafts 82R and 82L so that the leading end portions of the output hubs 83R and 83L and the leading end portions of the rotary shafts 82R and 82L confront each other in the axial direction.

The input discs 95 and 117, as splined on the end portions of the rotary shafts 82R and 82L, are provided with cylindrical portions extended to the outer circumferences of the output hubs 83R and 83L, so that the rotary shafts 82R and 82L and the output hubs 83R and 83L are connected to rotate relative to each other by radial bearings 108R and 108L fitted in the inner circumferences of the cylindrical portions. The output discs 96 and 118 and the cylinders 102 and 124 are integrally mounted on the outer circumferences of the output hubs 83R and 83L. The remaining constructions are basically similar to those of the third embodiment shown in FIG. 5.

In the drive system shown in FIG. 6, therefore, the electric power mechanism is constructed of the two motors 77R and 77L, and the rotary shafts 82R and 82L, as fixed in the rotors 80R and 80L, are connected to rotate relative to each other by the bearings 130. Thus, the drive mechanisms for the left and right wheels are constructed completely independently of each other. In other words, the left and right wheels are driven by the motors 77R and 77L provided therefor, so that their RPMs and torques are individually controlled. At a turning run, for example, a difference in the RPM between the inner and outer wheels can be established by making different the RPMs of the motors 77R and 77L or the gear ratios of the left and right continuously variable transmissions 92 and 114, thereby to smoothen the turn. Moreover tendency of oversteer or understeer can also be corrected by controlling the RPMs of the motors 77R and 77L or the gear ratios of the left and right continuously variable transmissions 92 and 114 on the basis of the input signals coming from the yaw rate sensor and the RPM sensors of the inner and outer wheels.

Since the drive trains of the left and right wheels are independent, as described above, an instantaneous input from one wheel can be damped or eliminated by the balance of force in the continuously variable transmissions 92 and 114 for that wheel. As a result, the so-called "inverse input torque" to the motors 77R and 77L can be avoided or reduced, and the inverse input torque from one wheel exerts no influence upon the drive train for the other wheel, so that the factors for disturbing the controls of the motors 77R and 77L can be reduced to improve the running stability.

In the construction shown in FIG. 6, moreover, the left and right rotary shafts 82R and 82L are not supported completely independently of each other, but their one-end portions are so fitted one in the other as to rotate relative to each other through the bearings 130. As a result, the support mechanisms of those rotary shafts 82R and 82L can be partially shared to shorten the overall length of the drive system. Here, the gear ratio can be suitably set by the left and right continuously variable transmissions 92 and 114, and the action to allow the differential rotations between the left and right wheels is similar to that of the aforementioned drive system of the third embodiment.

Figure 7:
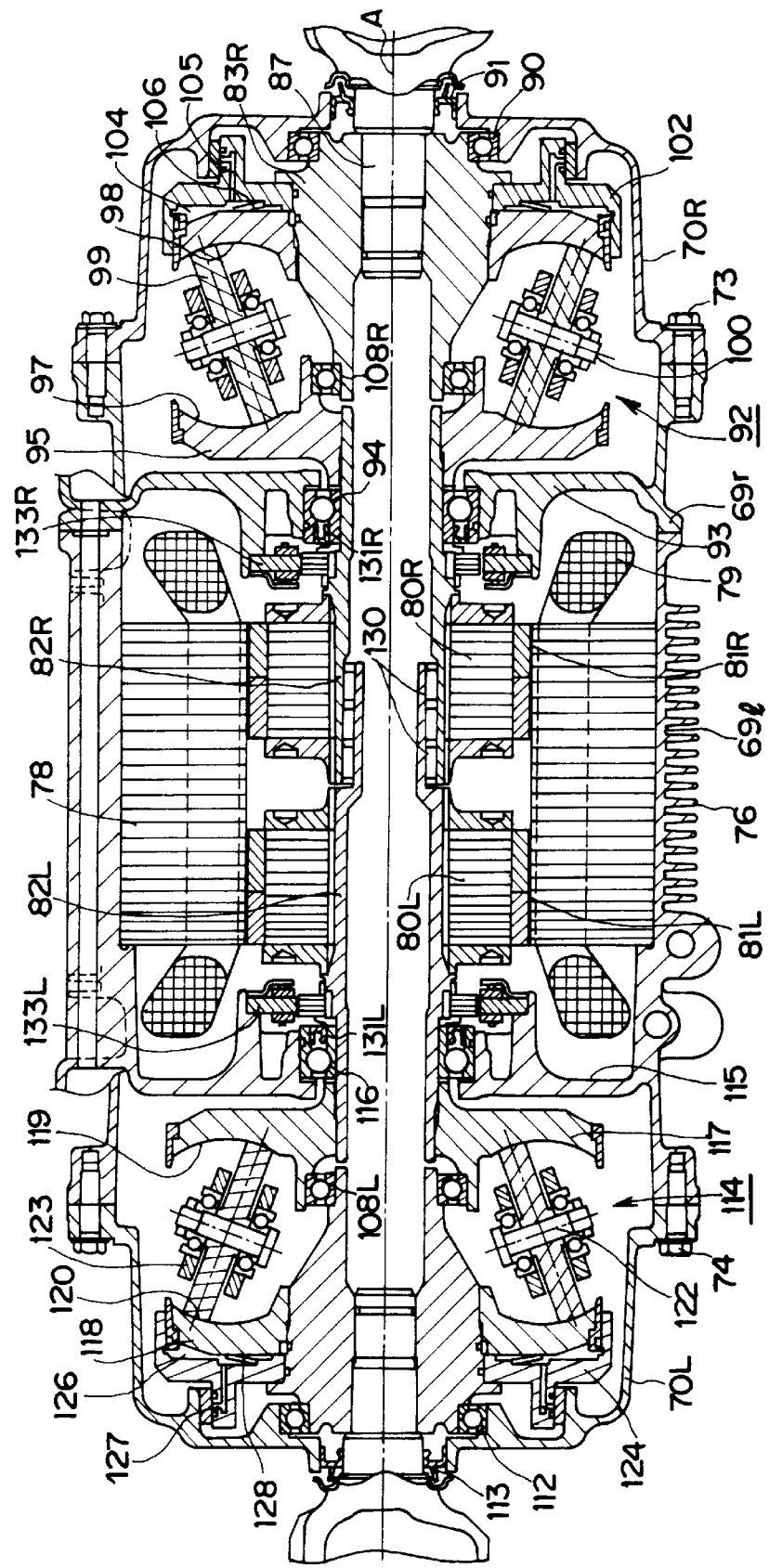
FIG. 7 is a section showing a fifth embodiment of the drive system for an electric vehicle according to the present invention.

A fifth embodiment of the present invention will be described with reference to FIG. 7. The embodiment shown in FIG. 7 is such an improvement over the aforementioned drive system shown in FIG. 6, that two rotors are provided for one stator. As shown in FIG. 7, the single stator 78 is arranged around the outer circumferences of the left and right rotors 80R and 80L. When the coil 79 of the stator 78 is energized, torques are established in the rotors 80R and 80L and are transmitted to the left and right drive wheels through the left and right continuously variable transmissions 92 and 114. On the other hand, the body 69 is constructed of a cylindrical member 691 having the inward flange 115 at its one end portion, and an end plate 69r having the flange 93 covering the open end of the cylindrical member 691. The remaining constructions are similar to those of the drive system shown in FIG. 6. In this construction shown in FIG. 7, the single stator 78 and the two rotors 80R and 80L correspond to the electric power mechanism of the present invention.

In the drive system shown in FIG. 7, therefore, the left and right wheels can be driven by energizing the coil 79 of the stator 78. In this case, the torques and RPMs are equalized between the rotary shafts 82R and 82L. However, the continuously variable transmissions 92 and 114 are provided independently for the left and right, so that the torques and the RPMs can be individually controlled for the left and right wheels. In addition, the differential rotations of the left and right wheels can be established according to the running resistance, or the inclination angles of the power rollers 99 and 121 can be generated by proper controls. In short, the torques or the RPMs of the left and right wheels are controlled by the continuously variable transmissions 92 and 114 which are provided to correspond thereto.

In the drive system shown in FIG. 7, moreover, the stator 78 is shared between the drive mechanisms for the left and right wheels, and the one-end portions of the rotary shafts 82R and 82L are fitted one in the other to rotate relative to each other through the bearings 130 so that the axial length of the drive system can be shortened in its entirety.

In the fourth and fifth embodiments thus far described, too, the individual continuously variable transmissions 92 and 114 may be constructed of the half-toroidal transmissions.

Here will be synthetically described the advantages to be attained from the present invention. According to the present invention, the first input disc, the first transmission rollers and the first output disc, and the second input disc, the second transmission rollers and the second output disc have the functions as the transmissions and the functions as the differentials. As a result, the number of parts of the drive system can be minimized to contribute to the reductions in the size and weight of the drive system.

Moreover, the first input disc, the first transmission rollers and the first output disc, and the second input disc, the second transmission rollers and the second output disc are individually arranged in the axial direction. As a result, the number of parts to be arrayed in the radial direction can be reduced to reduce the size of the drive system in the radial direction.

In addition to an effect described above, according to the present invention, the first input disc and the second input disc are arranged between the coil of the motor and the rotary shaft so that the space for arranging the parts in the axial direction can be reduced to provide a drive system having a small axial length.

In addition to an effect described above, according to the present invention, the angles of rotation of the first transmission rollers and the second transmission rollers are controlled according to the drive state of the motor to change the radial ratio at the side of the first transmission rollers and the radial ratio at the side of the second transmission rollers. As a result, the gear ratio according to the drive state of the motor is set to improve the driving performance of the drive system.

In addition to an effect described above, according to the present invention, the RPMs of the first drive shaft and the second drive shaft are automatically controlled according to the turning radius of the vehicle thereby to improve the turning performance of the electric vehicle.

What is claimed is:

1. A drive system for running an electric vehicle by transmitting a torque from an electric power mechanism for converting an electric energy into a rotating force and outputting it, to a first output shaft connected to a right-hand wheel and a second output shaft connected to a lefthand wheel, comprising:

a first input disc adapted to be rotated by the torque coming from said electric power mechanism;

a first output disc arranged to confront said first input disc in the axial direction and connected to said first output shaft;

disc-shaped first transmission rollers arranged between said first input disc and said first output disc for transmitting the torque inbetween while having their outer circumferences contacting with the confronting faces of the two discs and for inclining to change the radius of the contact points from the center axis of rotation of said two discs;

a second input disc adapted to be rotated by the torque coming from said electric power mechanism;

a second output disc arranged to confront said second input disc in the axial direction and connected to said second output shaft;

disc-shaped second transmission rollers arranged between said second input disc and said second output disc for transmitting the torque inbetween while having their outer circumferences contacting with the confronting faces of the two discs and for inclining to change the radius of the contact points from the center axis of rotation of said two discs;

a first support mechanism supporting said first transmission rollers at an inclination with respect to an orthogonal line perpendicular to said axis; and a second support mechanism supporting said second transmission rollers at an inclination with respect to the orthogonal line perpendicular to said axis, wherein said first output shaft and said second output shaft are arranged on the same axis as that of said electric power mechanism and at the two sides of said electric power mechanism, and wherein said first input disc and said second input disc are arranged on the same axis as that of said electric power mechanism and at the two sides of said electric power mechanism.

2. A drive system according to claim 1, wherein said two input discs and said two output discs have toroidal faces on their confronting faces.

3. A drive system according to claim 1, wherein said first input disc and said second input disc include discs given an external diameter smaller than that of said first output disc and said second output disc and made half-toroidal on their faces confronting the two output discs.

4. A drive system for running an electric vehicle by transmitting a torque from an electric power mechanism for converting an electric energy into a rotating force and outputting it, to a first output shaft connected to a right-hand wheel and a second output shaft connected to a lefthand wheel, comprising:

a first input disc adapted to be rotated by the torque coming from said electric power mechanism;

a first output disc arranged to confront said first input disc in the axial direction and connected to said first output shaft;

disc-shaped first transmission rollers arranged between said first input disc and said first output disc for transmitting the torque inbetween while having their outer circumferences contacting with the confronting faces of the two discs and for inclining to change the radius of the contact points from the center axis of rotation of said two discs;

a second input disc adapted to be rotated by the torque coming from said electric power mechanism;

a second output disc arranged to confront said second input disc in the axial direction and connected to said second output shaft;

disc-shaped second transmission rollers arranged between said second input disc and said second output disc for transmitting the torque inbetween while having their outer circumferences contacting with the confronting faces of the two discs and for inclining to change the radius of the contact points from the center axis of rotation of said two discs;

a first support mechanism supporting said first transmission rollers at an inclination with respect to an orthogonal line perpendicular to said axis; and a second support mechanism supporting said second transmission rollers at an inclination with respect to the orthogonal line perpendicular to said axis, wherein said electric power mechanism includes a motor having a rotor arranged on the same axis as that of said first and second output shafts, and a stator arranged around the outer circumference of said rotor and wound thereon with a coil in a state to protrude in the axial direction, wherein said first input disc and said second input disc are separately arranged at the two axial sides of said motor, and wherein said first input disc and said second input disc are on the rotor arranged in the inner circumference of said coil.

5. A drive system according to claim 4, wherein said two input discs and said two output discs have toroidal faces on their confronting faces.

6. A drive system for running an electric vehicle by transmitting a torque from an electric power mechanism for converting an electric energy into a rotating force and outputting it, to a first output shaft connected to a right-hand wheel and a second output shaft connected to a lefthand wheel, comprising:

a first input disc adapted to be rotated by the torque coming from said electric power mechanism;

a first output disc arranged to confront said first input disc in the axial direction and connected to said first output shaft;

disc-shaped first transmission rollers arranged between said first input disc and said first output disc for transmitting the torque inbetween while having their outer circumferences contacting with the confronting faces of the two discs and for inclining to change the radius of the contact points from the center axis of rotation of said two discs;

a second input disc adapted to be rotated by the torque coming from said electric power mechanism;

a second output disc arranged to confront said second input disc in the axial direction and connected to said second output shaft;

disc-shaped second transmission rollers arranged between said second input disc and said second output disc for transmitting the torque inbetween while having their outer circumferences contacting with the confronting faces of the two discs and for inclining to change the radius of the contact points from the center axis of rotation of said two discs;

a first support mechanism supporting said first transmission rollers at an inclination with respect to an orthogonal line perpendicular to said axis;

a second support mechanism supporting said second transmission rollers at an inclination with respect to the orthogonal line perpendicular to said axis;

an output control means for controlling the output of said electric power mechanism; and a first inclination angle control mechanism for controlling the angles of inclination of said first transmission rollers and said second transmission rollers with respect to said orthogonal line on the basis of the control state of said output control means.

7. A drive system according to claim 6, wherein said output control means includes: an accelerator pedal; and means for augmenting the output of said electric power mechanism in response to the depression of said accelerator pedal.

8. A drive system according to claim 6, wherein said output control means includes means electrically controlled for augmenting the output of said electric power mechanism.

9. A drive system according to claim 6, wherein said two input discs and said two output discs have toroidal faces on their confronting faces.

10. A drive system for running an electric vehicle by transmitting a torque from an electric power mechanism for converting an electric energy into a rotating force and outputting it, to a first output shaft connected to a right-hand wheel and a second output shaft connected to a lefthand wheel, comprising:

a first input disc adapted to be rotated by the torque coming from said electric power mechanism;

a first output disc arranged to confront said first input disc in the axial direction and connected to said first output shaft;

disc-shaped first transmission rollers arranged between said first input disc and said first output disc for transmitting the torque inbetween while having their outer circumferences contacting with the confronting faces of the two discs and for inclining to change the radius of the contact points from the center axis of rotation of said two discs;

a second input disc adapted to be rotated by the torque coming from said electric power mechanism;

a second output disc arranged to confront said second input disc in the axial direction and connected to said second output shaft;

disc-shaped second transmission rollers arranged between said second input disc and said second output disc for transmitting the torque inbetween while having their outer circumferences contacting with the confronting faces of the two discs and for inclining to change the radius of the contact points from the center axis of rotation of said two discs;

a first support mechanism supporting said first transmission rollers at an inclination with respect to an orthogonal line perpendicular to said axis;

a second support mechanism supporting said second transmission rollers at an inclination with respect to the orthogonal line perpendicular to said axis;

a steering angle sensor for detecting a steering angle;

a vehicle speed sensor for detecting a vehicle speed; and a second inclination angle control mechanism for controlling the inclination angles of said first transmission rollers and said second transmission rollers on the basis of said steering angle and said vehicle speed.

11. A drive system according to claim 10 wherein said two input discs and said two output discs have toroidal faces on their confronting faces.

12. A drive system for running an electric vehicle by transmitting a torque from an electric power mechanism for converting an electric energy into a rotating force and outputting it, to a first output shaft connected to a right-hand wheel and a second output shaft connected to a lefthand wheel, comprising:

a first input disc adapted to be rotated by the torque coming from said electric power mechanism;

a first output disc arranged to confront said first input disc in the axial direction and connected to said first output shaft;

disc-shaped first transmission rollers arranged between said first input disc and said first output disc for transmitting the torque inbetween while having their outer circumferences contacting with the confronting faces of the two discs and for inclining to change the radius of the contact points from the center axis of rotation of said two discs;

a second input disc adapted to be rotated by the torque coming from said electric power mechanism;

a second output disc arranged to confront said second input disc in the axial direction and connected to said second output shaft;

disc-shaped second transmission rollers arranged between said second input disc and said second output disc for transmitting the torque inbetween while having their outer circumferences contacting with the confronting faces of the two discs and for inclining to change the radius of the contact points from the center axis of rotation of said two discs;

a first support mechanism supporting said first transmission rollers at an inclination with respect to an orthogonal line perpendicular to said axis;

a second support mechanism supporting said second transmission rollers at an inclination with respect to the orthogonal line perpendicular to said axis; and an accommodation chamber accommodating said electric power mechanism liquid-tight.

13. A drive system according to claim 12, wherein said two input discs and said two output discs have toroidal faces on their confronting faces.

14. A drive system for running an electric vehicle by transmitting a torque from an electric power mechanism for converting an electric energy into a rotating force and outputting it, to a first output shaft connected to a right-hand wheel and a second output shaft connected to a lefthand wheel, comprising:

a first input disc adapted to be rotated by the torque coming from said electric power mechanism;

a first output disc arranged to confront said first input disc in the axial direction and connected to said first output shaft;

disc-shaped first transmission rollers arranged between said first input disc and said first output disc for transmitting the torque inbetween while having their outer circumferences contacting with the confronting faces of the two discs and for inclining to change the radius of the contact points from the center axis of rotation of said two discs;

a second input disc adapted to be rotated by the torque coming from said electric power mechanism;

a second output disc arranged to confront said second input disc in the axial direction and connected to said second output shaft;

disc-shaped second transmission rollers arranged between said second input disc and said second output disc for transmitting the torque inbetween while having their outer circumferences contacting with the confronting faces of the two discs and for inclining to change the radius of the contact points from the center axis of rotation of said two discs;

a first support mechanism supporting said first transmission rollers at an inclination with respect to an orthogonal line perpendicular to said axis; and a second support mechanism supporting said second transmission rollers at an inclination with respect to the orthogonal line perpendicular to said axis, wherein said electric power mechanism includes a first rotor integrated with a first rotary shaft connected to said first output shaft; a first stator arranged around the outer circumference of said first rotor for establishing an electromagnetic force to rotate said first rotor; a second rotor integrated with a second rotary shaft connected to said second output shaft and arranged on the same axis as that of said first rotary shaft; a second stator arranged around the outer circumference of said second rotor for establishing an electromagnetic force to rotate said second rotor; and a bearing for fitting and supporting the end portions of said first rotary shaft and said second rotary shaft rotatably.

15. A drive system according to claim 14, wherein said two input discs and said two output discs have toroidal faces on their confronting faces.

16. A drive system for running an electric vehicle by transmitting a torque from an electric power mechanism for converting an electric energy into a rotating force and outputting it, to a first output shaft connected to a right-hand wheel and a second output shaft connected to a lefthand wheel, comprising:

a first input disc adapted to be rotated by the torque coming from said electric power mechanism;

a first output disc arranged to confront said first input disc in the axial direction and connected to said first output shaft;

disc-shaped first transmission rollers arranged between said first input disc and said first output disc for transmitting the torque inbetween while having their outer circumferences contacting with the confronting faces of the two discs and for inclining to change the radius of the contact points from the center axis of rotation of said two discs;

a second input disc adapted to be rotated by the torque coming from said electric power mechanism;

a second output disc arranged to confront said second input disc in the axial direction and connected to said second output shaft;

disc-shaped second transmission rollers arranged between said second input disc and said second output disc for transmitting the torque inbetween while having their outer circumferences contacting with the confronting faces of the two discs and for inclining to change the radius of the contact points from the center axis of rotation of said two discs;

a first support mechanism supporting said first transmission rollers at an inclination with respect to an orthogonal line perpendicular to said axis; and a second support mechanism supporting said second transmission rollers at an inclination with respect to the orthogonal line perpendicular to said axis, wherein said electric power mechanism includes a first rotor integrated with a first rotary shaft connected to said first output shaft; a second rotor integrated with a second rotary shaft connected to said second output shaft and arranged on the same axis as that of said first rotary shaft; a stator arranged around the outer circumferences of said first rotor and said second rotor for establishing an electromagnetic force to rotate said first rotor and said second rotor; and a bearing for fitting and supporting the end portions of said first rotary shaft and said second rotary shaft rotatably.

17. A drive system according to claim 16, wherein said two input discs and said two output discs have toroidal faces on their confronting faces.

18. A drive system for running an electric vehicle by transmitting a torque from an electric power mechanism for converting an electric energy into a rotating force and outputting it, to a first output shaft connected to a right-hand wheel and a second output shaft connected to a lefthand wheel, comprising:

a first input disc adapted to be rotated by the torque coming from said electric power mechanism;

a first output disc arranged to confront said first input disc in the axial direction and connected to said first output shaft;

disc-shaped first transmission rollers arranged between said first input disc and said first output disc for transmitting the torque inbetween while having their outer circumferences contacting with the confronting faces of the two discs and for inclining to change the radius of the contact points from the center axis of rotation of said two discs;

a second input disc adapted to be rotated by the torque coming from said electric power mechanism;

a second output disc arranged to confront said second input disc in the axial direction and connected to said second output shaft;

disc-shaped second transmission rollers arranged between said second input disc and said second output disc for transmitting the torque inbetween while having their outer circumferences contacting with the confronting faces of the two discs and for inclining to change the radius of the contact points from the center axis of rotation of said two discs;

a first support mechanism supporting said first transmission rollers at an inclination with respect to an orthogonal line perpendicular to said axis;

a second support mechanism supporting said second transmission rollers at an inclination with respect to the orthogonal line perpendicular to said axis, an oil pressure chamber for thrusting either said first input disc or said first output disc in a direction to bring them close to each other; and an oil pressure chamber for thrusting either said second input disc or said second output disc in a direction to bring them close to each other.

19. A drive system according to claim 18, further comprising:

an elastic member arranged in each of said oil pressure chambers for thrusting either of said discs elastically.

20. A drive system according to claim 19, wherein said elastic member includes a washer.

21. A drive system according to claim 18, wherein said two input discs and said two output discs have toroidal faces on their confronting faces.

* * * * *